United States Patent
Pelchat, II et al.

[11] Patent Number: 5,857,633
[45] Date of Patent: Jan. 12, 1999

[54] CUPHOLDER WITH ENGAGING RINGS

[75] Inventors: Michael E. Pelchat, II, Davison; David Howard Reeder, Grand Blanc, both of Mich.

[73] Assignee: Toyota Technical Center U.S.A., Inc., Ann Arbor, Mich.

[21] Appl. No.: 805,341

[22] Filed: Feb. 24, 1997

Related U.S. Application Data

[63] Continuation of Ser. No. 699,335, Aug. 19, 1996, abandoned.

[51] Int. Cl.$^6$ ........................................................ A47K 1/09
[52] U.S. Cl. ................. 248/311.2; 224/926; 297/188.19; 74/526; 74/569; 74/96
[58] Field of Search .............................. 248/311.2, 309.1, 248/315, 314, 289.11, 289.31; 224/926, 281, 282; 296/37.15, 37.16, 37.8, 37.12, 37.13; 211/71.01, 85; 74/526, 569, 96; 297/188.16, 188.19

[56] References Cited

U.S. PATENT DOCUMENTS

| | | | |
|---|---|---|---|
| 1,906,779 | 5/1933 | Von Kalmann | 74/569 |
| 3,344,685 | 10/1967 | Crouzet | 74/569 |
| 4,511,072 | 4/1985 | Owens | 224/329 |
| 4,756,572 | 7/1988 | Dykstra et al. | 224/329 |
| 4,759,584 | 7/1988 | Dykstra et al. | 297/188.16 |
| 4,828,211 | 5/1989 | McConnell et al. | 248/311.2 |
| 4,953,771 | 9/1990 | Fischer et al. | 248/311.2 X |
| 4,955,571 | 9/1990 | Lorence et al. | 248/311.2 |
| 4,981,277 | 1/1991 | Elwell | 248/311.2 |
| 5,007,610 | 4/1991 | Christiansen et al. | 224/926 X |
| 5,024,411 | 6/1991 | Elwell | 248/311.2 |
| 5,060,899 | 10/1991 | Lorence et al. | 248/926 X |
| 5,096,152 | 3/1992 | Christinsen et al. | 248/311.2 |
| 5,190,259 | 3/1993 | Okazaki | 248/311.2 |
| 5,248,183 | 9/1993 | Gignac et al. | 248/311.2 X |
| 5,253,838 | 10/1993 | Spykerman | 248/311.2 |
| 5,259,580 | 11/1993 | Anderson et al. | 248/311.2 |
| 5,330,146 | 7/1994 | Spykerman | 224/281 X |
| 5,351,723 | 10/1994 | Reudi | 74/569 X |
| 5,628,486 | 5/1997 | Rossman et al. | 224/926 X |

FOREIGN PATENT DOCUMENTS

| | | |
|---|---|---|
| 90-19441 | 1/1991 | Japan . |
| 3-57138 | 5/1991 | Japan . |
| 5-34035 | 5/1993 | Japan . |
| 6-72227 | 3/1994 | Japan . |

*Primary Examiner*—Derek J. Berger
*Assistant Examiner*—Stephen S. Wentsler
*Attorney, Agent, or Firm*—Burns, Doane, Swecker & Mathis, LLP

[57] ABSTRACT

A cup holder for holding receptacles such as cans, bottles and the like includes a housing and a pair of receptacle holding rings rotatably mounted on the housing for movement in different planes between a retracted position in which the holding rings are located in the interior of the housing and an extended position in which the holding rings extend out of the housing. A closure element is also provided for closing the open front of the housing when the receptacle holding rings are in the retracted position. The receptacle holding rings are provided with engaging elements that engage one another when the receptacle holding rings are in the extended position. The engaging elements define a predefined stop position for the two rings in the extended position. Additionally, tabs are provided on one of the rings to prevent the rings from crossing over one another.

23 Claims, 4 Drawing Sheets

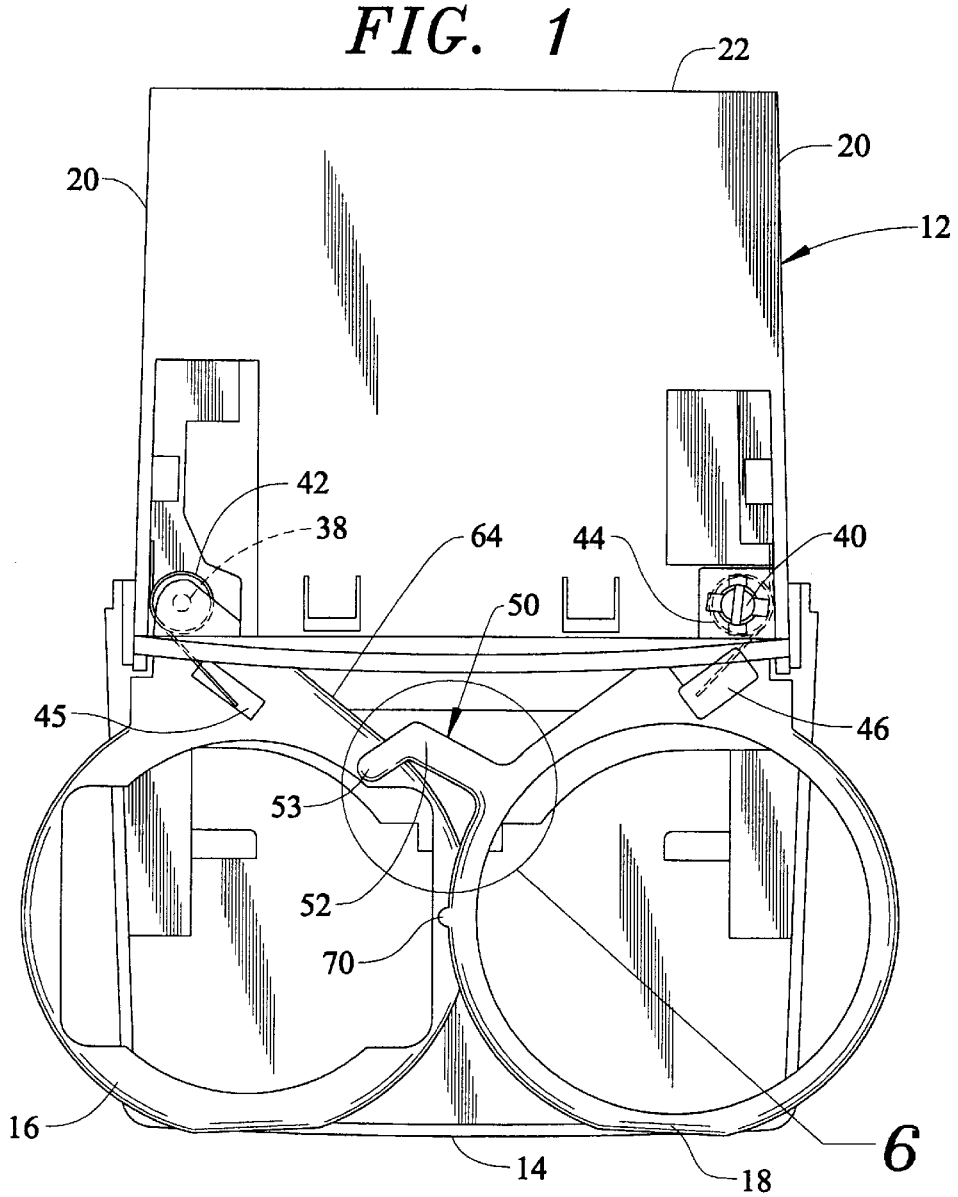
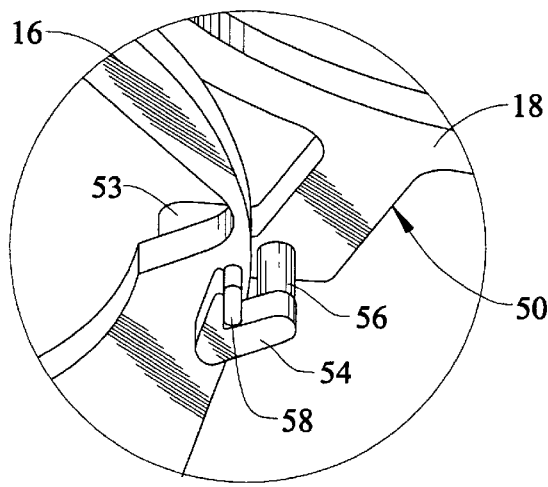

5,857,633

CUPHOLDER WITH ENGAGING RINGS

This application is a continuation of application Ser. No. 08/699,335 filed on Aug. 19, 1996 abandoned.

FIELD OF THE INVENTION

The present invention relates to a cup holder and more particularly to a cup holder for vehicles that is adapted to hold cans, containers and other types of receptacles.

BACKGROUND OF THE INVENTION

Efforts have been made to increase the comfort, functionality and usefulness of automotive vehicles of all types. In one respect, automotive vehicles have been outfitted with cup holders to provide the driver and front seat passengers with a place to hold cans, cups and other types of receptacles. The cup holders have taken various forms such as recessed areas provided in the dashboard or center console and similarly located slidable trays provided with cup receiving apertures. Other forms of cup holders have involved the use of cup receiving rings.

Many of the known types of cup holders are designed to be moved from an extended position to a stored position so that the cup holder can be moved out of the way when not in use. While these types of cup holders are able to perform their intended function of holding receptacles, they suffer from various drawbacks and disadvantages.

In one respect, the cup holders are typically designed to accommodate at least two cans, cups or the like. In the past, this has meant that the cup holders are rather large in size because of the space needed to house the cup holder when it is moved to the stored position. Unfortunately, the space available in vehicles for accommodating cup holders is oftentimes limited and so constraints may exist with respect to where the cup holders can be located.

In the case of ring type cup holders, it has been found that the rings are not particularly well suited to withstanding the application of force (e.g., if an individual inadvertently presses down on the rings while trying to place a can in the ring). Thus, these types of holders are susceptible of being broken. This is due at least in part to the construction of the ring type cup holder as well as the material from which the cup holder is made. Further, the rings are susceptible of becoming misaligned.

SUMMARY OF THE INVENTION

In light of the foregoing, a need exists for a cup holder which is relatively strong and able to withstand potentially damaging forces.

It would also be desirable to provide a cup holder that is relatively compact in size so that it can be located in areas of limited space.

A need also exists for a cup holder of improved quality that is able to avoid misalignment of the receptacle receiving elements.

In light of the foregoing, the present invention provides a cup holder for holding receptacles containing contents that includes a housing having a plurality of walls bounding an interior and an open front, a first receptacle holding ring rotatably mounted on the housing for movement in a first plane between a retracted position in which the first receptacle holding ring is located in the interior of the housing and an extended position in which the first receptacle holding ring extends through the open front to be positioned exteriorly of the housing for receiving a receptacle, and a second receptacle holding ring rotatably mounted on the housing for movement in a second plane disposed above the first plane between a retracted position in which the second receptacle holding ring is located in the interior of the housing and an extended position in which the second receptacle holding ring extends through the open front to be positioned exteriorly of the housing for receiving a receptacle. A peg extends from the first receptacle holding ring and a hook extends from the second receptacle holding ring to be positioned on one side of first receptacle holding ring for engaging the peg when the first and second receptacle holding rings are located in the extended position. A tab also extends from the second receptacle holding ring to be positioned on a side of the first receptacle holding ring opposite the one side when the first and second receptacle holding rings are in the extended position. A closure element is pivotally connected to the housing at the open front for movement between a closed position in which the closure element covers the open front of the housing with the first and second receptacle holding rings housed in the interior of the housing and an open position in which the closure element is spaced from the open front to permit the first and second receptacle holding rings to be moved to the extended position.

In accordance with another aspect of the invention, a cup holder for holding receptacles includes a housing having an interior bounded by a plurality of walls, a first receptacle holding ring rotatably mounted on the housing for movement between a housed position in which the first receptacle holding ring is housed within the interior of the housing and an extended position in which the first receptacle holding ring extends exteriorly of the interior of the housing for receiving a receptacle, and a second receptacle holding ring rotatably mounted on the housing for movement between a housed position in which the second receptacle holding ring is housed within the interior of the housing and an extended position in which the second receptacle holding ring extends exteriorly of the interior of the housing for receiving a receptacle. The first receptacle holding ring is rotatable in a plane different from the plane in which the second receptacle holding ring is rotatable. In addition, the second receptacle holding ring is provided with a first portion positioned on one side of the first receptacle holding ring when the first and second receptacle holding rings are in the extended position and a second portion positioned on an opposite side of the first receptacle holding ring when the first and second receptacle holding rings are in the extended position so that the first receptacle holding ring is straddled by the first and second portions of the second receptacle holding ring when the first and second receptacle holding rings are in the extended position to inhibit misalignment of the first and second receptacle holding rings.

According to another aspect of the invention, a cup holder for holding receptacles containing contents includes a housing having an interior bounded by a plurality of walls, a first receptacle holding ring rotatably mounted on the housing for movement between a retracted position in which the first receptacle holding ring is housed in the interior of the housing and an extended position in which the first receptacle holding ring extends exteriorly of the interior of the housing for receiving a receptacle, and a second receptacle holding ring rotatably mounted on the housing for movement between a retracted position in which the first receptacle holding ring is housed in the interior of the housing and an extended position in which the second receptacle housing ring extends exteriorly of the interior of the housing for receiving a receptacle. The first receptacle holding ring is rotatable in a first plane and the second receptacle holding ring is rotatable in a second plane positioned above the first plane. A peg extends from the first receptacle holding ring and a hook extends from the second receptacle holding ring for engaging the peg extending from the first receptacle holding ring when the first and second receptacle holding rings are disposed in the extended position.

Another aspect of the present invention involves the combination of a center console for a vehicle that includes front seating locations and rear seating locations, and a cup holder for holding receptacles. The center console is positionable between the front seating locations in a vehicle and has a rearward facing end adapted to face towards the rear seating locations and an oppositely disposed frontward facing end. The rearward facing end of the center console is provided with an opening and the cup holder is mounted in the opening in the rearward facing end of the center console. The cup holder includes a first receptacle holding ring rotatably mounted for movement between a retracted position in which the first receptacle holding ring is housed in the center console and an extended position in which the first receptacle holding ring extends exteriorly of the center console. The cup holder also includes a second receptacle holding ring rotatably mounted for movement between a retracted position in which the second receptacle holding ring is housed in the center console and an extended position in which the second receptacle holding ring extends exteriorly of the center console.

BRIEF DESCRIPTION OF THE DRAWING FIGURES

The foregoing and additional features of the invention will become apparent from the detailed description set forth below considered in conjunction with the drawing figures in which like elements are designated by like reference numerals and wherein:

FIG. 1 is a top plan view of the cup holder depicting the closure element in the open position and the pair of receptacle holding rings in the extended position;

FIG. 6 is a bottom perspective view of the detail circled in FIG. 1 depicting the engaging structure on the two receptacle holding rings;

DETAILED DESCRIPTION OF THE INVENTION

Figure 2:
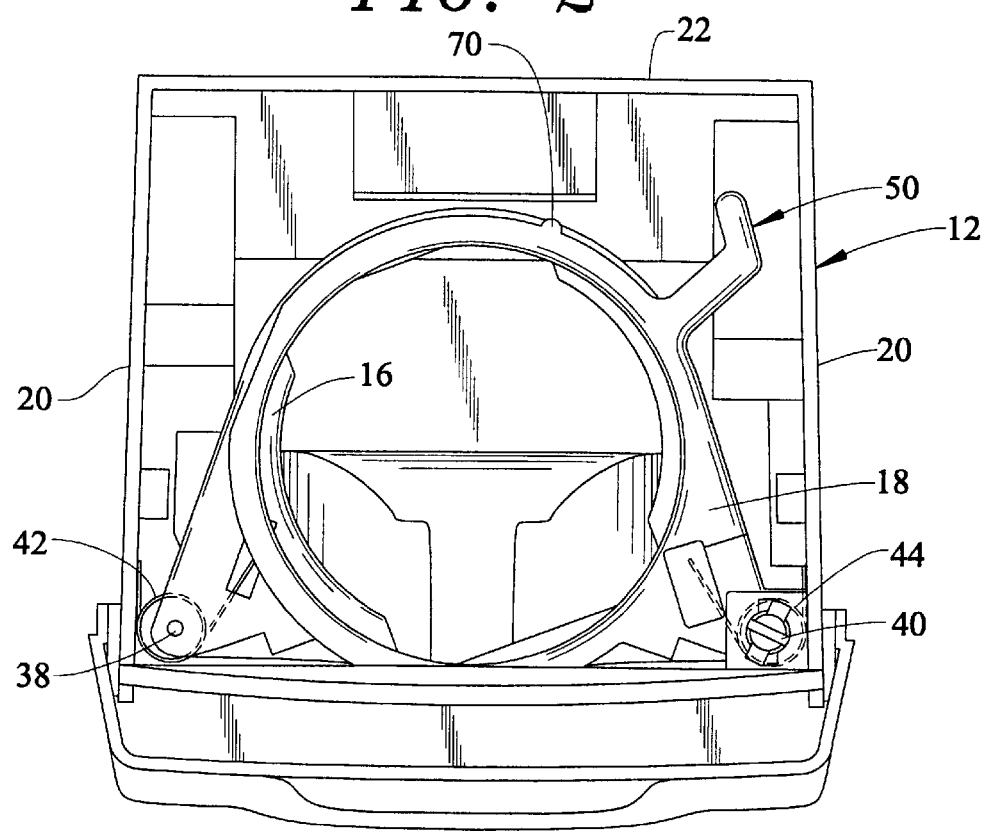
FIG. 2 is a top plan view of the cup holder shown in FIG. 1 with the top portion of the housing removed and with the closure element in the closed position and the receptacle holding rings in the retracted or housed position.
Figure 4:
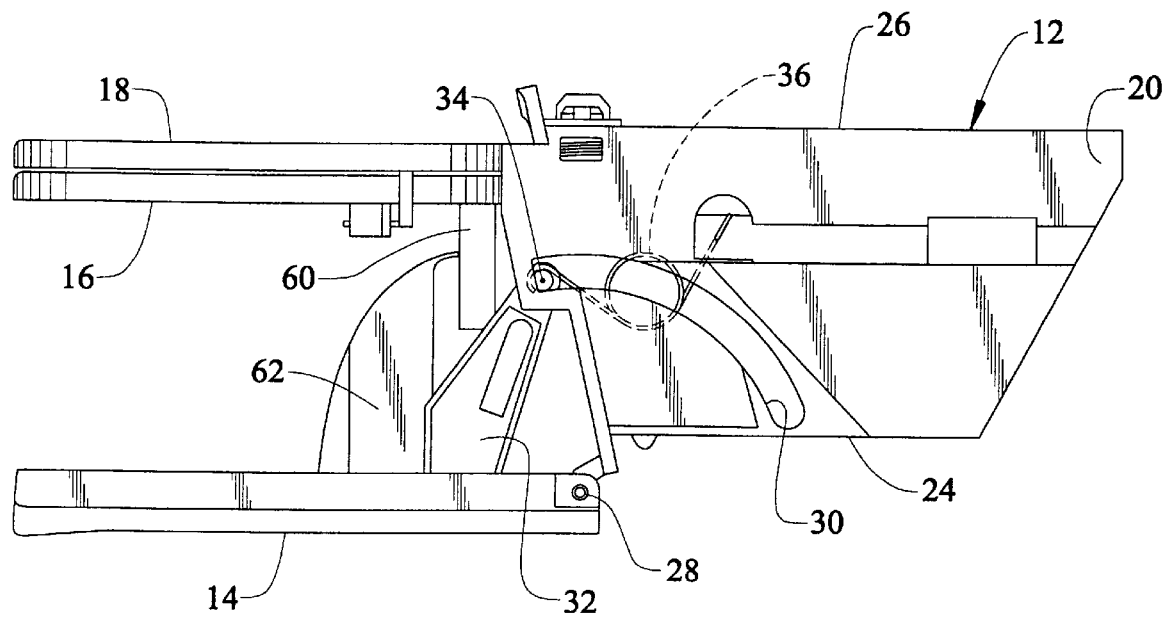
FIG. 4 is a side view of the cup holder illustrated in FIG. 1.

With reference initially to FIG. 1, the cup holder 10 according to the present invention includes three main parts consisting of a housing 12, a pair of receptacle holding rings 16, 18 rotatably mounted on the housing 12, and a closure element or cover 14. The housing 12 is defined by a plurality of walls that include two side walls 20 and a rear wall 22 as shown in FIG. 2 as well as a bottom wall 24 and a top wall 26 as shown in FIG. 4. The walls 20, 22, 24 and 26 bound or surround or hollow interior within the housing 12.

The housing 12 is also provided with an open front that is covered by the closure element or cover 14. The closure element 14 is pivotally mounted on the open front of the housing 12 at a pivot pin 28 as shown in FIG. 4. The closure element 14 is adapted to be moved between the open position shown in FIG. 4 in which the open front of the housing 12 is exposed and the closed position shown in FIG. 5 in which the open front of the housing 12 is covered.

Figure 5:
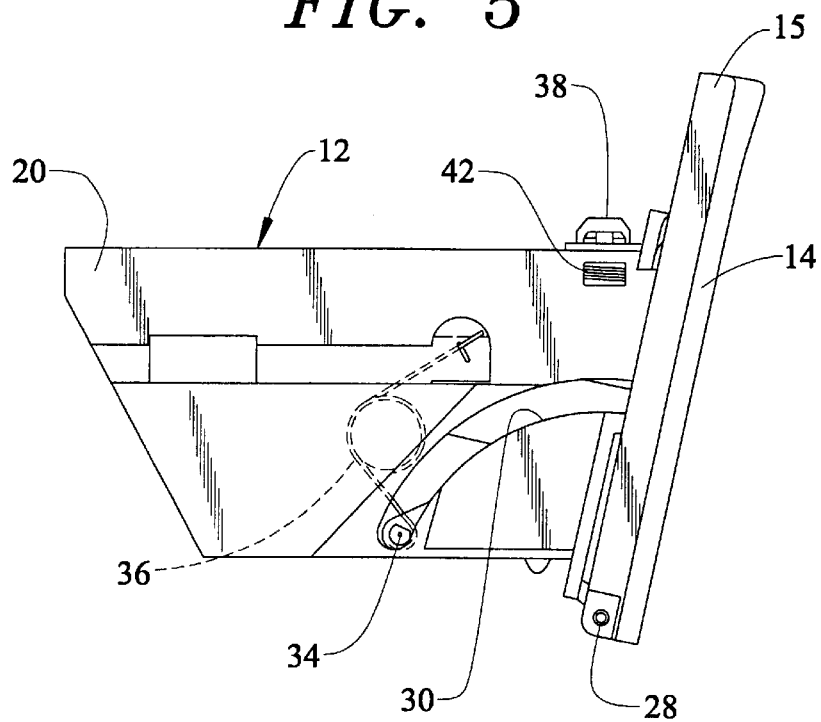
FIG. 5 is a side view of the cup holder shown in FIG. 2.

As seen with reference to FIG. 4, one of the side walls 20 of the housing 12 is provided with an elongated arcuate slot 30. Similarly, as seen in FIG. 5, the opposite side wall of the housing 12 includes an elongated arcuate slot 30. The closure element 14 is also outfitted with a pair of pin mounting arms 32 disposed at opposite sides of the closure element 14. A pin 34 is disposed at the free end of each pin mounting arm 32 and is received in the arcuate slot 30 in the adjacent sidewall 20 of the housing 12. During the pivoting movement of the closure element 14 between the open position and the closed position, the pins 34 are move along their respective slots 30. The pins 34 eventually engage the end of their respective slot 32 to thereby prevent further opening movement of the closure element 14.

The closure element 14 is normally biased in the open position shown in FIG. 4 by way of two torsion springs 36 which are depicted in FIGS. 4 and 5. Each of the torsion springs 36 is disposed between a retaining portion on the interior part of the housing 12 and a portion of the pin mounting arm 32.

Turning back to FIG. 1, the pair of receptacle holding rings that are rotatably mounted on the housing 12 includes a first receptacle holding ring 16 and a second receptacle holding ring 18. Both of the receptacle holding rings 16, 18 are designed to receive a cup, can, glass or any other type of contents containing receptacle. The receptacle holding rings 16, 18 can be suitably sized, shaped and configured depending upon the type and size of the receptacle for which the cup holder is designed.

Figure 3:
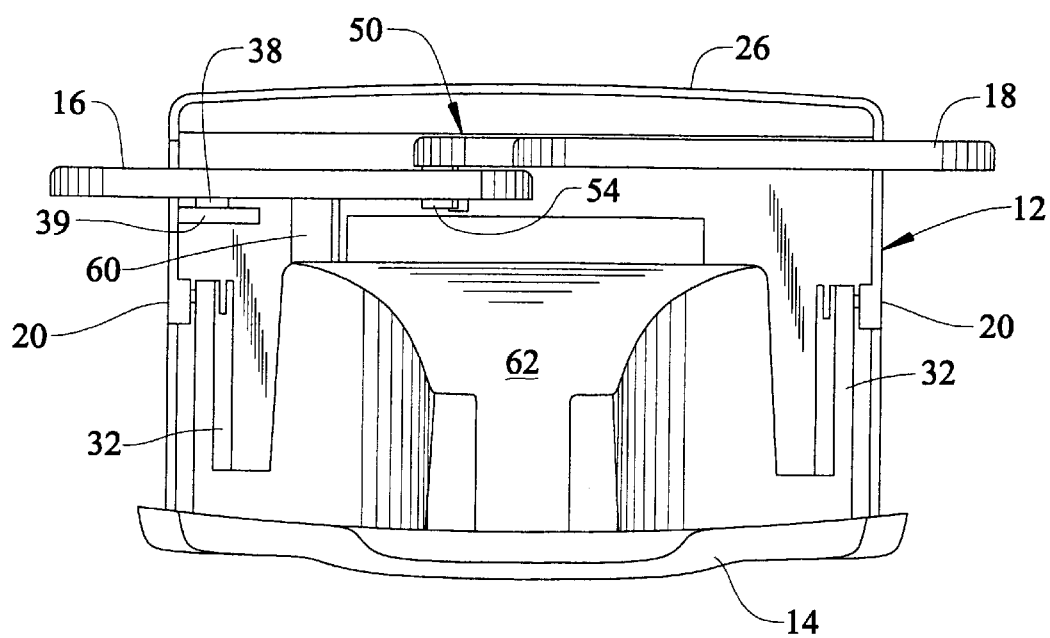
FIG. 3 is a front view of the cup holder shown in FIG. 1.

As seen with reference to FIGS. 3 and 4, the first receptacle holding ring 16 is positioned for rotation in a first plane while the second receptacle holding ring 18 is positioned for rotation in a second plane. The plane in which the first receptacle holding ring 16 rotates is different from the plane in which the second receptacle holding ring 18 rotates. Further, the second receptacle holding ring 18 is rotatable in a plane positioned above the plane in which the first receptacle holding ring 16 rotates.

The first receptacle holding ring 16 is rotatably mounted on the housing 12 by way of a pin 38. The pin 38 is rotatably mounted in a ledge 39 that extends inwardly from the interior surface of the adjacent side wall 20 as seen in FIG. 3. Similarly, the second receptacle holding ring 18 is rotatably mounted on the housing 12 by way of a pin 40. The pin 40 is rotatably mounted on the top wall 26 of the housing 12.

The first and second receptacle holding rings 16, 18 are adapted to be rotated in their respective planes from the extended position shown in FIG. 1 to the housed or retracted position illustrated in FIG. 2. In the extended position, the receptacle holding rings 16, 18 extend through the open front of the housing 12 so as to be exterior of the housing interior. In the housed or retracted position, the receptacle holding rings 16, 18 are disposed within the interior of the housing.

As can be readily appreciated from a review of FIG. 2, when the first and second receptacle holding rings 16, 18 are in the housed or retracted position within the interior of the housing 12, the two rings 16, 18 overlap one another almost identically. That is, when the two receptacle holding rings 16, 18 are in the retracted position, their respective centers are substantially coincident and their respective central axes are substantially coaxial. This result can be achieved by appropriately positioning the pins 38, 40 relative to the configuration and size of the rings 16, 18

One advantage associated with this arrangement is that the space needed to house the receptacle holding rings 16, 18 when they are in the retracted position within the interior of the housing 12 is rather small. This means that the housing 12 can be made rather small and compact in size, thereby facilitating the usefulness and adaptability of the cup holder of the present invention, particularly in situations where space constraints exist.

As seen with reference to FIG. 1, the first and second receptacle holding rings 16, 18 are normally biased or urged towards the extended position by respective torsion springs 42, 44. One end of each torsion spring 42, 44 is adapted to engage the inner wall surface of the adjacent sidewall 20 while the other end of each torsion spring 40, 42 is adapted to engage a respective retaining portion 45, 46 provided on the respective receptacle holding ring 16, 18.

As generally illustrated in FIGS. 1 and 2, the second receptacle holding ring 18 is provided with an extension arm 50. The extension arm 50 includes a substantially L-shaped portion 52. The free end portion of the L-shaped portion 52 defines a tab 53 is adapted to overlie or be positioned above the first receptacle holding ring 16 when the first and second receptacle holding rings 16, 18 are in the extended position shown in FIG. 1. Further details associated with the extension arm 50 are illustrated in FIG. 6.

As seen with reference to FIG. 6 which illustrates additional details associated with the extension arm 50, a hook element 54 is adapted to underlie or be positioned below the first receptacle holding ring 16 when the first and second receptacle holding rings 16, 18 are in the extended position. This hook 54 is connected to the L-shaped portion 52 by way of a connecting portion 56. The second receptacle holding ring 18 is also provided with a radially outwardly extending tab 70 that is adapted to be located above or overlie the first receptacle holding ring 16 when the first and second receptacle holding rings 16, 18 are in the extended position.

Thus, as illustrated in FIG. 6, when the first and second receptacle holding rings 16, 18 are in the extended position, the tab 53 of the L-shaped portion 52 and the hook 54 are positioned on either side of the first receptacle holding ring 16. In this way, a portion of the first receptacle holding ring 16 is positioned between or straddled by the hook 54 and the tab 53 of the L-shaped portion 52. At the same time, the tab 70 overlies the first receptacle holding ring 16. This arrangement is particularly useful in the context of preventing the two rings 16, 18 from crossing over one another. That is, the hook element 54 of the extension arm 50 provides bottom alignment of the rings 16, 18 while the two tabs 53, 70 prevent the first receptacle holding ring 16 from moving up over the second receptacle holding ring 18.

As the two rings 16, 18 move from the extended position to the stored position, the tab 53 at the end of the L-shaped portion 52 and the hook element 54 of the extension arm 50 continue to straddle the first receptacle holding ring 16. This straddling of the first receptacle holding ring 16 continues over a substantial portion of the rotational movement of the rings 16, 18 from the extended position to the retracted position. As the two rings 16, 18 traverse their respective arcs of movement towards the retracted position, the rings 16, 18 overlap one another to a continually greater extent. Eventually, the first receptacle holding ring 16 moves away from its position between the L-shaped portion 52 and the hook element 54 of the extension arm 50. At this point, the second receptacle holding ring 18 overlies the first receptacle holding ring 16 to such an extent that even though the first receptacle holding ring 16 is no longer straddled by the tab 53 and the hook element 54 of the extension arm 50, the two rings 16, 18 are not able to inadvertently cross over one another.

In addition, the extension arm 50 facilitates alignment of the rings 16, 18 the same way each time the receptacle holding rings 16, 18 are moved from the retracted position to the extended position. It is also been found that the tabs 53, 70 and the hook 54 tend to make the two receptacle holding rings 16, 18 act as a single unit when the two receptacle holding rings 16, 18 are in the extended position. That is, if a downward force is applied to either of the receptacle holding rings 16, 18, the two rings tend to act together to resist the force by virtue of the fact that the tabs 53, 70 and the hook 54 straddle a portion of the first receptacle holding ring 16. Thus, the engaging nature of the two rings 16, 18 provides a cup holder that is much stronger than would otherwise be the case.

As further seen with reference to FIG. 6, extending downwardly from the lower surface of the first receptacle holding ring 16 is a peg 58. This peg 58 is adapted to be engaged by the hook element 54 of the extension arm 50 when the first and second receptacle holding rings 16, 18 are in the extended position. This interengagement between the hook 54 and the peg 58 not only further contributes to the two receptacle holding rings tending to act together as a single unit, but also functions to stop the motion of the two rings 16, 18 as they move from the stored position to the extended position.

The engagement of the hook 54 with the peg 58 ensures that the rings 16, 18 stop at the same location each time. This contributes to improvement in the quality of the cup holder. Also adding to the quality is the fact that the two rings 16, 18 are aligned the same way each time the rings are moved between the retracted position and the extended position.

FIGS. 3 and 4 best illustrate the mechanism utilized to effect movement of the receptacle holding rings 16, 18 from the extended position to the stored position. Extending downwardly from the lower surface of the first receptacle holding ring 16 is a leg 60. Also, extending generally perpendicularly away from the closure element 14 is a leg engaging member 62. The leg engaging member 62 is adapted to engage the leg 60 extending from the first receptacle holding ring 16 as the closure element 14 is pivoted upwardly from the open position shown in FIG. 4 towards the closed position shown in FIG. 5. The leg engaging member 62 contacts the leg 60 and urges the leg 60 rearwardly towards the interior of the housing 12. This causes the first receptacle holding ring 16 to rotate about the axis of the p in 3 8. The force applied by the leg engaging member 62 to the leg 60 and the receptacle holding ring 16 by virtue of the closing movement of the closure element 14 is in opposition to the biasing force of the spring 42.

Looking at FIG. 1, the closing movement of the closure element 14 causes the first receptacle holding ring 16 to rotate in the counter-clockwise direction so that the ring 16 moves towards the interior of the housing 12. This rotation of the first receptacle holding ring 16 also causes the second receptacle holding ring 18 to rotate in the clockwise direction by virtue of the engagement of the extension arm 50 with the outer peripheral surface 64 of the first receptacle holding ring 16. That is, as the first receptacle holding ring 16 rotates, the outer peripheral surface 64 of the first receptacle holding ring 16 pushes against the connecting portion 56 of the extension arm 50, thus causing rotation of the second receptacle holding ring 18. As the closure element 14 continues to move towards the closed position, the leg engaging member 62 continues to push the leg 60 inwardly, and eventually the first and second receptacle holding rings 16, 18 are completely housed in the interior of the housing 12. As the rings 16, 18 near the completely stored position within the interior of the housing 12, the connecting portion 56 of the extension arm 50 eventually moves away from the outer peripheral surface 64 of the first receptacle holding ring 16 so that the rotation of the first receptacle holding ring 16 no longer causes rotation of the second receptacle holding ring 18. At this point, the second receptacle holding ring 18 is forced inwardly to the fully retracted position by engagement with the closure element 14.

It can be seen, therefore, that the extension arm 50 performs the additional function of transferring rotational movement of the first receptacle holding ring 16 to the second receptacle holding ring 18 during the closing movement of the cup holder.

As can be seen with reference to FIGS. 1 and 4, when the cup holder is open with the first and second receptacle holding rings 16, 18 in the extended position, the closure element 14 lies below the two receptacle holding rings 16, 18. As a result, the closure element 14 serves as a support tray for receptacles held in the receptacle holding rings 16, 18.

As described above, the torsion springs 36 are adapted to normally urge the closure element 14 to the open position. However, the cup holder is designed so that when the closure element 14 is in the closed position shown in FIG. 5, the biasing force of the torsion springs 36 is insufficient to force the closure element 14 away from the closed position. However, when an individual pulls on the top edge 15 of the closure element 14 to move the closure element 14 away from the closed position, the torsion springs 36 automatically force the closure element 14 into the fully open position. The opening movement of the closure element 14 is stopped when each of the pins 34 engage the end of the respective slot 30.

Based on the foregoing, it can be appreciated that the cup holder according to the present invention provides significant advantages over other known types of cup holders. In one respect, the overall construction of the cup holder is compact and relatively small in size. This due at least in part to the fact that the two rings 16, 18 overlap one another in the stored position and thus occupy much less space than would otherwise be the case.

Figure 7:
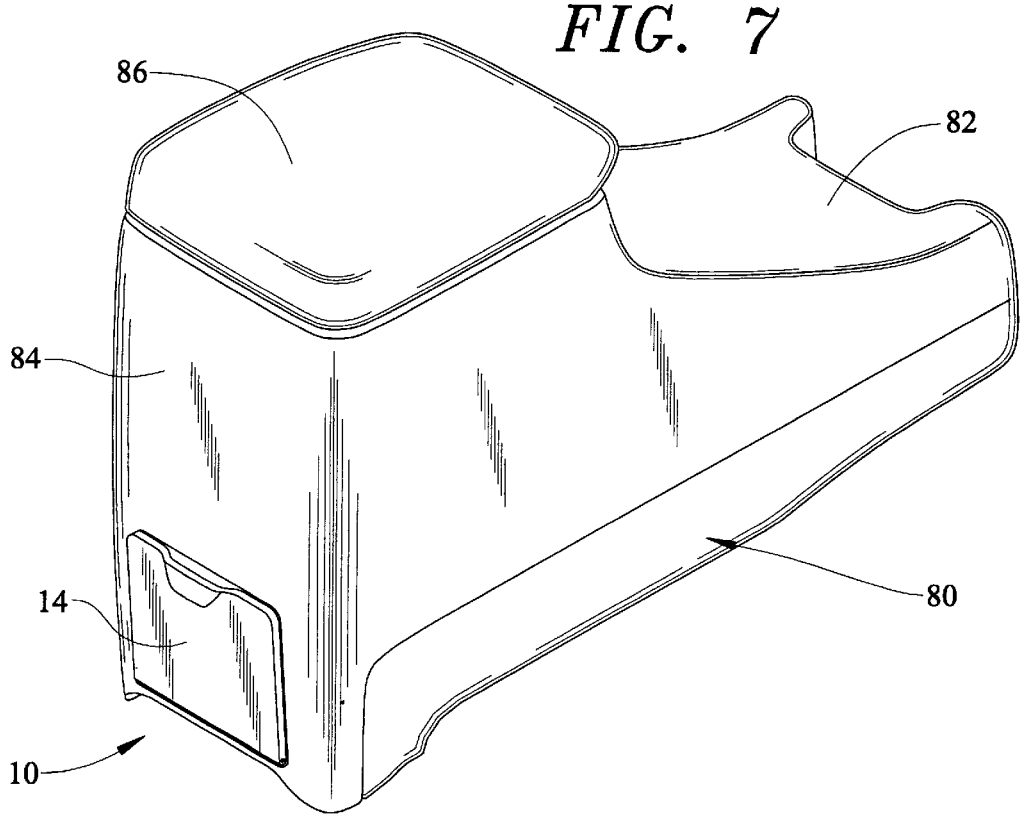
FIG. 7 is a rear perspective view of a center console or arm rest for a vehicle illustrating the cup holder in the retracted or housed position.
Figure 8:
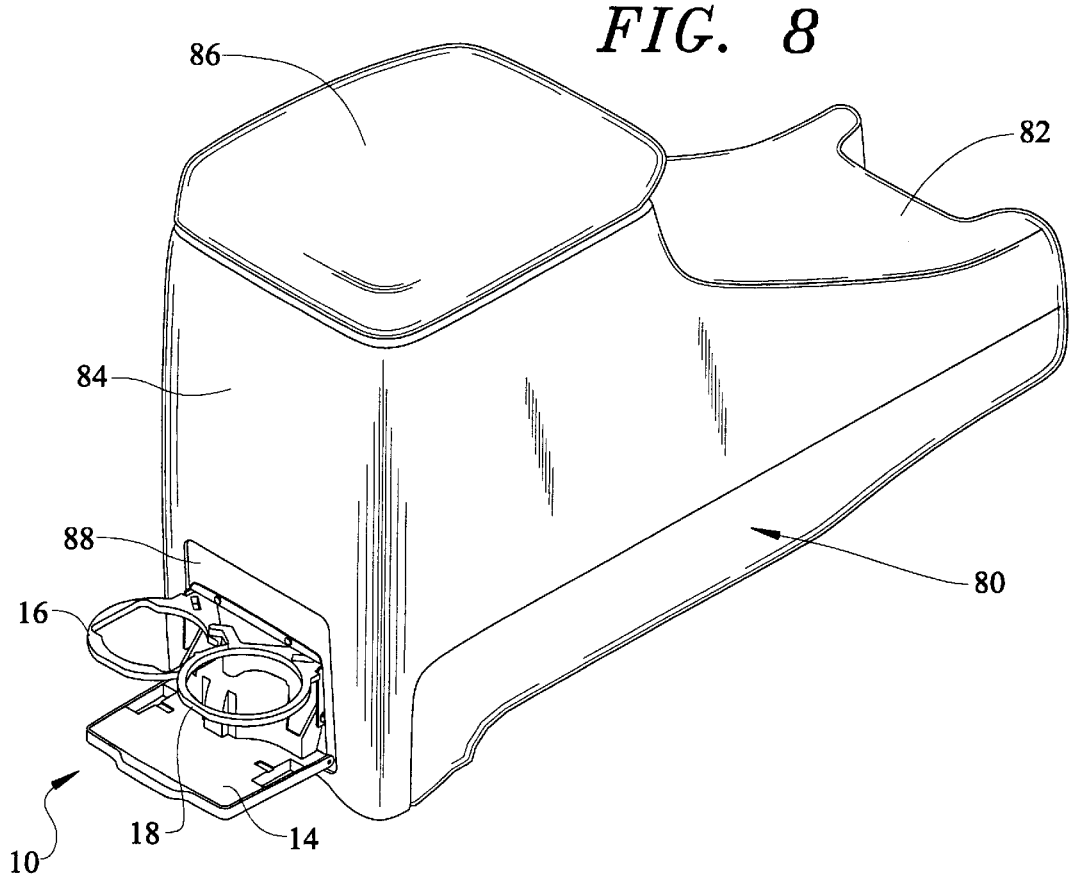
FIG. 8 is a rear perspective view of the center console or arm rest shown in FIG. 7 illustrating the cup holder in the extended position.

The relatively small and compact arrangement of the cup holder according to the present invention is advantageous as it allows the cup holder to be located in areas of a vehicle which previously could not be considered. For example, the cup holder is capable of being positioned in the rear portion of an arm rest or center console in a vehicle. FIGS. 7 and 8 illustrate such a center console or arm rest for a vehicle in which the cup holder of the present invention is mounted.

As seen in FIGS. 7 and 8, the center console 80 consists of a generally elongated body that is adapted to be mounted between the front seats or front seating locations of a vehicle. The console includes a forward facing end 82 that is adapted to face in the forward direction of the vehicle when the console is mounted in the vehicle and an oppositely located rearward facing end 84 that is adapted to face in the rearward direction of the vehicle towards the rear seat or rear seating locations in the vehicle. Thus, the rearward facing end 84 of the console is accessible to occupants sitting in the rear seat(s) of the vehicle. The center console 80 can also include an arm rest portion 86 on which the driver and/or passenger in the front seating locations of the vehicle can rest one of their arms. The arm rest portion 86 can be movable between an opened and closed position to permit access to a storage compartment in the center console. The details of such a movable arm rest portion are known and thus will not be described here in detail.

The rearward facing end 84 of the center console 80 is provided with an opening 88 as seen in FIG. 8 in which is mounted the cup holder 10 of the present invention. In this regard, the housing 12 of the cup holder is adapted to be mounted in the opening 88 so that the entire cup holder 10 is secured in place with respect to the console 80. FIG. 8 depicts the cup holder 10 in the open position with the two receptacle holding rings 16, 18 in the extended position while FIG. 7 shows the cup holder in the closed position with two receptacle holding rings in the housed position within the console.

Generally speaking, the width of the center console is limited by various space constraints such as the available space between the front seats or front seating locations. Until the present invention, the relatively small width dimension of the center console significantly limited manufacturer's ability to place a dual ring cup holder in the rearwardly facing end of the center console. The cup holder of the present invention, by virtue of its overall construction and the fact that the two receptacle holding rings occupy a relatively small space when in the closed or housed position, now makes it possible to mount a dual ring cup holder in the rearward facing end of the center console so that occupants in the rear seat(s) of a vehicle are able to temporarily store cans and other types of receptacles in a readily accessible location.

The cup holder of the present invention is also well suited to preventing misalignment of the two receptacle holding rings 16, 18 during movement between the stored and extended positions. Also, when the rings 16, 18 are in the extended position, the two rings are not susceptible of becoming misaligned or crossing over one another. Further, the rings tend to act together as a unit when they are in the extended position and are thus better able to avoid becoming broken or otherwise damaged if a force is applied to one of the rings. This also means that the strength of the material from which the rings are made is not critical.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A cup holder for holding receptacles containing contents, comprising:

a housing having a plurality of walls bounding an interior, the housing having an open front;

a first receptacle holding ring rotatably mounted on the housing for movement in a first plane between a retracted position in which the first receptacle holding ring is located in the interior of the housing and an extended position in which the first receptacle holding ring extends through the open front to be positioned exteriorly of the housing for receiving a receptacle;

a second receptacle holding ring rotatably mounted on the housing for movement in a second plane disposed above the first plane between a retracted position in which the second receptacle holding ring is located in the interior of the housing and an extended position in which the second receptacle holding ring extends through the open front to be positioned exteriorly of the housing for receiving a receptacle;

a peg extending from the first receptacle holding ring;

a hook extending from the second receptacle holding ring to be positioned on one side of first receptacle holding ring and engage the peg when the first and second receptacle holding rings are located in the extended position;

a tab extending from the second receptacle holding ring to be positioned on a side of the first receptacle holding ring opposite said one side when the first and second receptacle holding rings are in the extended position; and closure element pivotally connected to the housing at the open front for movement between a closed position in which the closure element covers the open front of the housing with the first and second receptacle holding rings housed in the interior of the housing and an open position in which the closure element is spaced from the open front to permit the first and second receptacle holding rings to be moved to the extended position.

2. The cup holder according to claim 1, including a leg extending downwardly from the first receptacle holding ring and an extension extending from the closure element, said extension extending from the closure element engaging the leg extending from the first receptacle holding ring during movement of the closure element from the open position to the closed position to cause the first receptacle holding ring to rotate from the extended position towards the retracted position.

3. The cup holder according to claim 1, including a spring positioned between a portion of the housing and a portion of the closure element for normally urging the closure element towards the open direction.

4. The cup holder according to claim 1, wherein said plurality of walls includes two oppositely positioned walls each provided with an arcuate slot, said closure element being provided with a pair of arms, each of the arms including a portion disposed in one of the arcuate slots to move along the slot during movement of the closure element between the open and closed positions.

5. The cup holder according to claim 1, including a first spring positioned between the housing and the first receptacle holding ring for urging the first receptacle holding ring towards the extended position, and a second spring positioned between the housing and the second receptacle holding ring for urging the second receptacle holding ring towards the extended position.

6. The cup holder according to claim 5, wherein said tab is a first tab, and including a second tab extending from the second receptacle holding ring being positioned on the side of the first receptacle holding ring opposite said one side when the first and second receptacle holding rings are in the extended position.

7. The cup holder according to claim 1, wherein the closure element is positioned to be located below the first and second receptacle holding rings when the closure element is in the open position and the first and second receptacle holding rings are in the extended position so that the closure element is adapted to support receptacles received in the first and second receptacle holding rings.

8. A cup holder for holding receptacles, comprising:

a housing having an interior bounded by a plurality of walls;

a first receptacle holding ring rotatably mounted on the housing for movement between a housed position in which the first receptacle holding ring is housed within the interior of the housing and an extended position in which the first receptacle holding ring extends exteriorly of the interior of the housing for receiving a receptacle;

a second receptacle holding ring rotatably mounted on the housing for movement between a housed position in which the second receptacle holding ring is housed within the interior of the housing and an extended position in which the second receptacle holding ring extends exteriorly of the interior of the housing for receiving a receptacle, said first receptacle holding ring being rotatable in a plane different from the plane in which the second receptacle holding ring is rotatable;

said second receptacle holding ring being provided with a first portion formed as a part of the second receptacle holding ring and positioned on one side of the first receptacle holding ring when the first and second receptacle holding rings are in the extended position and a second portion formed as a part of the second receptacle holding ring and positioned on an opposite side of the first receptacle holding ring when the first and second receptacle holding rings are in the extended position so that the first receptacle holding ring is straddled by the first and second portions of the second receptacle holding ring when the first and second receptacle holding rings are in the extended position to inhibit misalignment of the first and second receptacle holding rings.

9. The cup holder according to claim 8, including a closure element pivotally attached to the housing to close an open front of the housing.

10. The cup holder according to claim 9, including a leg extending downwardly from the first receptacle holding ring and an extension extending from the closure element, said extension extending from the closure element engaging the leg extending from the first receptacle holding ring during movement of the closure element from an open position to a closed position to cause the first receptacle holding ring to rotate from the extended position towards the housed position.

11. The cup holder according to claim 9, including a spring positioned between a portion of the housing and a portion of the closure element for normally urging the closure element towards an open direction in which the open front of the housing is covered by the closure element.

12. The cup holder according to claim 8, including a peg extending from one side of the first receptacle holding ring.

13. The cup holder according the claim 12, wherein said first portion of the second receptacle holding ring is a hook which engages the peg extending from the one side of the first receptacle holding ring when the first and second receptacle holding rings are in the extended position.

14. The cup holder according to claim 8, including one spring acting on the first receptacle holding ring for normally urging the first receptacle holding ring towards the extended position and another spring acting on the second receptacle holding ring for urging the second receptacle holding ring towards the extended position.

15. The cup holder according to claim 8, wherein the first receptacle holding ring includes an outer peripheral surface portion that is engaged by a portion of the second receptacle holding ring connecting the first and second portions of the second receptacle holding ring so that movement of the first receptacle holding ring from the extended position towards the housed position automatically causes said second receptacle holding ring to move from the extended position towards the housed position.

16. The cup holder according to claim 8, including a peg extending from one side of the first receptacle holding ring, and wherein said first portion of the second receptacle holding ring engages the peg extending from the one side of the first receptacle holding ring when the first and second receptacle holding rings are in the extended position.

17. A cup holder for holding receptacles containing contents, comprising:
   a housing having an interior bounded by a plurality of walls;
   a first receptacle holding ring rotatably mounted on the housing for movement between a retracted position in which the first receptacle holding ring is housed in the interior of the housing and an extended position in which the first receptacle holding ring extends exteriorly of the interior of the housing for receiving a receptacle, said first receptacle holding ring being rotatable in a first plane;
   a second receptacle holding ring rotatably mounted on the housing for movement between a retracted position in which the first receptacle holding ring is housed in the interior of the housing and an extended position in which the second receptacle housing ring extends exteriorly of the interior of the housing for receiving a receptacle, said second receptacle holding ring being rotatable in a second plane positioned above the first plane;
   a peg extending from said first receptacle holding ring;
   a hook extending from said second receptacle holding ring for engaging the peg extending from the first receptacle holding ring when the first and second receptacle holding rings are disposed in the extended position.

18. The cup holder according to claim 17, wherein said peg extends from the first receptacle holding ring.

19. The cup holder according to claim 17, including a closure element pivotally connected to the housing and pivotable between one position in which an open front of the housing is closed and another position in which the closure element is spaced from the open front of the housing to permit the first and second receptacle holding rings to extend through the open front of the housing.

20. The cup holder according to claim 19, including a leg extending downwardly from the first receptacle holding ring and an extension extending from the closure element, said extension extending from the closure element engaging the leg extending from the first receptacle holding ring during movement of the closure element from the another position to the one position to cause the first receptacle holding ring to rotate from the extended position towards the retracted position.

21. The cup holder according to claim 17, including a first spring operatively associated with the first receptacle holding ring for urging the first receptacle holding ring towards the extended position, and a second spring operatively associated with the second receptacle holding ring for urging the second receptacle holding ring towards the extended direction.

22. A combination of a center console for a vehicle that includes front seating locations and rear seating locations, and a cup holder for holding receptacles, comprising:
   the center console being generally elongated and positionable between the front seating locations in a vehicle, the center console having a rearward facing end adapted to face towards the rear seating locations and an oppositely disposed frontward facing end, the rearward facing end of the center console being provided with an opening; and
   the cup holder being mounted in the opening in the rearward facing end of the center console, the cup holder including a first receptacle holding ring rotatably mounted for movement between a retracted position in which the first receptacle holding ring is housed in the center console and an extended position in which the first receptacle holding ring extends exteriorly of the center console, the cup holder also including a second receptacle holding ring rotatably mounted for movement between a retracted position in which the second receptacle holding ring is housed in the center console and an extended position in which the second receptacle holding ring extends exteriorly of the center console, the first and second receptacle holding rings being rotatable mounted for movement in different planes, the first receptacle holding ring having a peg extending therefrom and the second receptacle holding ring having a hook extending therefrom which engages the peg when the first and second receptacle holding rings are disposed in the extended position.

23. The combination recited in claim 22, wherein said second receptacle holding ring is provided with a first portion positioned on one side of the first receptacle holding ring when the first and second receptacle holding rings are in the extended position and a second portion positioned on an opposite side of the first receptacle holding ring when the first and second receptacle holding rings are in the extended position so that the first receptacle holding ring is straddled by the first and second portions of the second receptacle holding ring when the first and second receptacle holding rings are in the extended position to inhibit misalignment of the first and second receptacle holding rings.

\* \* \* \* \*